Patented June 3, 1941

2,244,487

UNITED STATES PATENT OFFICE 2,244,487

DIMETHYL ALPHA, ALPHA'-DIMETHYLDI-HYDROMUCONATE

John William Croom Crawford, Frodsham, England, assignor to Imperial Chemical Industries Limited, a corporation of Great Britain No Drawing. Application February 14, 1940, Serial No. 318,833

1 Claim. (Cl. 260—485)

This invention relates to a new composition of matter and more particularly to the preparation of dimethyl alpha, alpha' - dimethyldihydro - muconate. Still more particularly, it relates to a dimer of methyl methacrylate and to its recovery from crude distillation residues.

One of the principal procedures for preparing methyl methacrylate involves the simultaneous alcoholysis and dehydration of acetone cyanohydrin by reacting it with methanol and fuming sulfuric acid. Pure methyl methacrylate is recovered from the reaction mixture by careful fractional distillation. The residue remaining from the fractional distillation is usually recycled, that is to say, it is added to another batch of acetone cyanohydrin. If this process is repeated several times, the residues obtained in each successive distillation gradually assume a different character owing to the accumulation of various by-products, and eventually it becomes impracticable to continue the recycling procedure. It is from these still residues that a dimeric form of methyl methacrylate has now been separated. This dimer appears to be dimethyl alpha, alpha'-dimethyldihydromuconate.

This invention, accordingly, has as its object to provide a new and valuable dimer of methyl methacrylate. A further object of the invention is the isolation of said methyl methacrylate dimer from still residues obtained in the preparation of methyl methacrylate. Yet another object is to provide a new composition of matter, dimethyl alpha, alpha'-dimethyldihydromuconate.

These and other objects hereinafter apparent are accomplished according to this invention wherein the residues from the preparation of methyl methacrylate monomer are fractionally distilled at reduced pressure, and a fraction containing methyl methacrylate dimer is separated.

Diminished pressure is used when redistilling the residues from the distillation of crude methyl methacrylate in order to reduce the decomposition attendant upon distillation at higher pressures and resulting higher temperatures. It has been found that an absolute pressure of 40 to 60 mm. is satisfactory, and preferably about 50 mm. absolute. The dimer fraction is collected at a temperature range of between 110° C. and 140° C. at 50 mm.

The following example is illustrative:

*Example.*—A 2423 gram sample of residues obtained from the distillation of crude methyl isomethacrylate is subjected to distillation under diminished pressure. There is obtained first a 370 g. of foreshot material, B. P. 60–110° C./50 mm., which comprises mainly methacrylic acid. Thereafter, 788 g. of impure methyl methacrylate dimer is distilled at temperatures between 110° and 140° C./50 mm. The residue consists of higher boiling compounds containing some polymeric products. The crude dimer fraction is washed thoroughly with dilute caustic soda solution until the aqueous layer remains permanently alkaline to phenol-phthalein, and finally with water until neutral. The product is dried over calcium chloride and when dry weighs 605 g. The dried product is subjected to careful fractional distillation under reduced pressure. There is obtained a small amount of low boiling material, apparently consisting of a binary mixture of methyl methacrylate monomer and dimer. The main fraction, however, comprises a pure dimer of methyl methacrylate having the following physical constants:

$$D_{20}^{20}, 1.0421; N_D^{20}, 1.4457$$

boiling point, 125° C./22 mm.; and molecular weight (determined cryoscopically in benzene), 193. The calculated molecular weight for methyl methacrylate dimer is 200.

Evidence for the presence of two carboxyl groups in this compound is provided by analysis for saponification number: Calculated for $C_{10}H_{16}O_4$ (methyl methacrylate dimer): Sap. No., 561; Found: Sap. No., 564.8.

The presence of one double bond in the dimer molecule is clearly demonstrated by the following experiment: 50 g. of dimer is dissolved in 50 cc. of carbon tetrachloride, and to this is added gradually 40 g. of bromine dissolved in 25 cc. of carbon tetrachloride. The reaction is carried out at 30°–40° C. in bright sunlight, and after adding an increment of the bromine solution, the color is allowed to disappear before making a further addition. When all the bromine is added, the solvent is evaporated and the liquid residue distilled under diminished pressure. The bulk of the product is a heavy liquid, boiling point, 170°–175° C./14–15 mm. Analysis for bromine gives the following results: Calculated for $C_{10}H_{16}O_4Br_2$ (methyl methacrylate dimer dibromide): Br. 44.40. Found: Br. 43.97.

Methyl methacrylate dimer readily undergoes hydrolysis to produce the corresponding acid. For example, on refluxing 100 g. of methyl methacrylate dimer with 250 cc. of 6N sodium hydroxide solution in the presence of 0.2 g. of sodium isobutylnaphthalene sulfonate, the ester phase disappears in about four hours. Acidification with a 10% excess of concentrated hydrochloric acid leads to separation of the dimer acid as an oil which crystallizes on cooling. On filtering the solid and recrystallizing from 200 cc. of boiling water, there is obtained 65 g. of warty crystals, M. P. 88–89° C.

Convincing evidence of the structure of the dimer acid is provided by reduction to a mixture of the meso and racemic forms of alpha, alpha'-dimethyladipic acid, which have been previously described by Zelinsky (Ber., 24, 3997 (1891)), and by Mohr (Ber., 34, 807 (1901)). The reduction is conveniently carried out as follows: 10 g. of dimer acid, 30 g. of 57% hydriodic acid, and 4 g. of red phosphorus are mixed and sealed in a Carius tube, which is heated for 15 hours at 150° C. There is obtained a colorless product containing a little unchanged phosphorus. The product is diluted with 50 cc. of water and filtered, and the acid separated from the filtrate by repeated extraction with ether. Evaporation of the ether solution gives a crystalline residue stained with some iodine. This product is purified by dissolving in hot water and decolorizing with sulfur dioxide. On cooling, white crystals are deposited, which after one recrystallization from water melt over the range from 122° to 125° C. After five recrystallizations there is obtained a dibasic acid, M. P. 140° C., which is identical with the meso form of alpha, alpha'-dimethyladipic acid reported by Zelinsky. The racemic isomer has the melting point 75° to 76° C. Analysis for neutral equivalent gives the following values: Calculated for $C_8H_{14}O_4$: N. E., 174.16. Found: N. E., 174.3.

The double bond in the dimer acid is in the alpha, beta position as shown by oxidation to methyl succinic acid. Six and nine-tenths grams of recrystallized dimer acid is dissolved in 50 cc. of water and neutralized with normal sodium hydroxide solution. To this mixture 37 g. of potassium permanganate is added in small portions while maintaining the temperature in the neighborhood of about 80° C. After all the permanganate has been added the solution retains a permanent pink coloration, which is destroyed by adding sufficient alcohol to reduce unchanged permanganate. The solution is filtered to separate precipitated manganese dioxide, which is thoroughly washed with water and the washings added to the main filtrate. The filtrate is acidified with a slight excess of concentrated hydrochloric acid and evaporated to dryness. After drying overnight in vacuo over soda lime, the residue is carefully extracted several times with ether and the combined ether extracts evaporated at room temperature. The residue is taken up in water and neutralized to phenolphthalein with normal sodium hydroxide and the neutral solution concentrated to approximately 50 cc. To the boiling solution is added a slight excess of calcium chloride solution. After a brief interval, small crystals appear which rapidly develop into a crystalline precipitate. The precipitate is separated by filtration and washed thoroughly several times with water. After drying in vacuo over sulfuric acid, analysis of this product for calcium gives the value, Ca, 19.58%. The calculated value for calcium methyl succinate dihydrate $(CaC_5H_6O_4 \cdot 2H_2O)$ is 19.45%. This result shows that the double bond is in the alpha, beta position and that the permanganate oxidation proceeded according to the following equation:

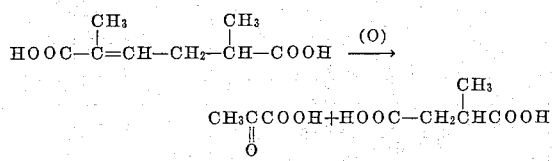

Pyruvic acid is converted successively to oxalic acid and carbon dioxide. If the double bond were in the beta, gamma position, oxidation would produce two molecules of methylmalonic acid. Calcium methylmalonate has the formula, $CaC_4H_4O_4 \cdot H_2O$ and contains 22.93% calcium.

The methyl methacrylate dimer of this invention is a valuable new composition of matter, which may be obtained according to the procedure outlined in the above example or in other ways, as for example by the dimerization process described in copending application Serial No. 246,832, filed December 20, 1938. This product is useful as a chemical intermediate for the preparation of resins, plasticizers, and the like and can be employed in the preparation of other esters of alpha, alpha'-dimethyldihyromuconic acid, which are of interest as plasticizers, modifiers, or blending agents for synthetic or natural resins. Other uses of methyl methacrylate dimer will be readily apparent to those skilled in the art.

Having described in full detail the preferred embodiments of the invention, it is to be understood that various changes may be made without departing from the spirit and scope of the appended claim:

I claim:

Dimethyl alpha, alpha'-dimethyldihydromuconate.

JOHN WILLIAM CROOM CRAWFORD.